United States Patent
Mottur et al.

(10) Patent No.: US 10,812,420 B2
(45) Date of Patent: Oct. 20, 2020

(54) METHOD AND SYSTEM FOR MULTI-MEDIA MESSAGING AND COMMUNICATIONS FROM MOBILE ENABLED NETWORKED DEVICES DIRECTED TO PROXIMATE ORGANIZATIONS BASED ON GEOLOCATED PARAMETERS

(71) Applicant: Vizsafe, Inc., Middletown, RI (US)

(72) Inventors: Peter A. Mottur, Portsmouth, RI (US); Brendan J. Hanna, Somerset, MA (US); Claude P. Sheer, Asheville, NC (US)

(73) Assignee: Vizsafe, Inc., Middletown, RI (US)

( * ) Notice: Subject to any disclaimer, the term of this patent is extended or adjusted under 35 U.S.C. 154(b) by 422 days.

(21) Appl. No.: 15/481,263

(22) Filed: Apr. 6, 2017

(65) Prior Publication Data
US 2017/0295115 A1    Oct. 12, 2017

Related U.S. Application Data

(60) Provisional application No. 62/319,547, filed on Apr. 7, 2016.

(51) Int. Cl.
| | | |
|---|---|---|
| *G06F 15/16* | (2006.01) | |
| *H04L 12/58* | (2006.01) | |
| *H04L 29/08* | (2006.01) | |
| *H04W 4/02* | (2018.01) | |
| *H04W 4/90* | (2018.01) | |
| *H04W 4/12* | (2009.01) | |

(52) U.S. Cl.
CPC ............... *H04L 51/04* (2013.01); *H04L 51/20* (2013.01); *H04L 67/18* (2013.01); *H04W 4/023* (2013.01); *H04W 4/12* (2013.01); *H04W 4/90* (2018.02)

(58) Field of Classification Search
USPC ............... 709/203, 206, 219, 227, 228, 229
See application file for complete search history.

(56) References Cited

U.S. PATENT DOCUMENTS

| | | |
|---|---|---|
| 7,308,246 B2 | 12/2007 | Yamazaki et al. |
| 8,019,271 B1 | 9/2011 | Izdepski |
| 8,417,258 B2 | 4/2013 | Barnes, Jr. |
| 8,483,654 B2 | 7/2013 | Levinson et al. |

(Continued)

FOREIGN PATENT DOCUMENTS

WO    2016005799 A1    1/2016

*Primary Examiner* — Liang Che A Wang
(74) *Attorney, Agent, or Firm* — Barlow, Josephs & Holmes, Ltd.; David Josephs (57) ABSTRACT

The method and system described herein automatically directs a user's posts or requests for assistance to the appropriate organization responsible for responding to or addressing the incident reported, as based on that user's location and the location of the appropriate organization. A query of a database of organizations, categorized by location and purpose, determines the appropriate organization relevant to a user's location and incident type and generates a full report for review as geolocated on a map with the associated multi-media content. The method and system can also send an automatic message from an organization to a specific user in response to such user's post or request for assistance and establish a two-way communication between the user and the assigned organization based on the foregoing.

21 Claims, 8 Drawing Sheets

(56) References Cited

U.S. PATENT DOCUMENTS

| | | |
|---|---|---|
| 8,548,419 B1 | 10/2013 | Sennett et al. |
| 8,548,423 B2 | 10/2013 | Rao |
| 8,878,938 B2 | 11/2014 | Levinson et al. |
| 8,880,718 B2 | 11/2014 | Caudle et al. |
| 8,929,851 B2 | 1/2015 | Mills et al. |
| 8,948,732 B1 | 2/2015 | Negahban et al. |
| 8,989,700 B2 | 3/2015 | Cordero et al. |
| 9,154,562 B2 | 10/2015 | Schulzrinne et al. |
| 9,154,740 B2 | 10/2015 | Levinson et al. |
| 9,196,307 B2 | 11/2015 | Caudle et al. |
| 2004/0248585 A1* | 12/2004 | Karacaoglu ............ H04W 24/00 455/456.1 |
| 2005/0063334 A1* | 3/2005 | Fnu ....................... H04W 48/16 370/329 |
| 2007/0142055 A1* | 6/2007 | Toivanen ............... H04H 60/44 455/450 |
| 2007/0155360 A1* | 7/2007 | An .......................... G08G 1/01 455/403 |
| 2008/0198811 A1* | 8/2008 | Deshpande ........... H04W 48/16 370/332 |
| 2009/0005080 A1 | 1/2009 | Forstall et al. |
| 2009/0270091 A1* | 10/2009 | Joshi ..................... H04W 48/16 455/434 |
| 2009/0279681 A1* | 11/2009 | McKee ................... H04L 67/18 379/201.02 |
| 2010/0175000 A1* | 7/2010 | Gupta .................... H04L 51/14 715/753 |
| 2011/0299481 A1* | 12/2011 | Kim ....................... H04W 52/30 370/329 |
| 2014/0365574 A1* | 12/2014 | Franks ................ H04L 12/1895 709/204 |
| 2014/0379813 A1* | 12/2014 | Charania ................ H04L 51/02 709/206 |
| 2015/0222672 A1 | 8/2015 | Vaughn et al. |
| 2015/0271655 A1* | 9/2015 | Jatavallabhula ........ H04W 4/90 455/404.1 |
| 2015/0304300 A1* | 10/2015 | Bender ............... H04L 12/1895 726/4 |
| 2016/0014583 A1* | 1/2016 | Thomaschima ........ H04W 4/90 455/404.2 |
| 2016/0119424 A1* | 4/2016 | Kane .................... G08B 27/001 709/203 |
| 2016/0164916 A1* | 6/2016 | Satish ................... G06F 16/285 726/1 |
| 2017/0054784 A1* | 2/2017 | Panattu ................... H04L 65/80 |

\* cited by examiner

METHOD AND SYSTEM FOR MULTI-MEDIA MESSAGING AND COMMUNICATIONS FROM MOBILE ENABLED NETWORKED DEVICES DIRECTED TO PROXIMATE ORGANIZATIONS BASED ON GEOLOCATED PARAMETERS

CROSS REFERENCE TO RELATED APPLICATION

This patent document claims priority to earlier filed U.S. Provisional Patent Application No. 62/319,547, filed on Apr. 7, 2016, the entire contents of which are incorporated herein by reference.

BACKGROUND OF THE INVENTION

The method and system described herein relates to multi-media communications that can be directed to proximate organizations based on geolocated parameters. These communications include the composition, distribution, receipt and managing of data to and from users over a network related to their location for multimedia based incident viewing and reporting using mobile and fixed devices, such as camera enabled phones, tablets, portable computers, laptops and workstations. Such incident based reporting supports posting of multimedia (content), user and content geolocation, mapping and bi-directional communications (2-way) and can include but is not limited to photos, videos, live video streaming, audio clips, live audio streaming, text based messaging and associated metadata such as latitude, longitude, elevation, floor level, field of view, orientation, bearing, date, time, user details, device, carrier, network information and the secure storage, filtering and retrieval of such data.

SUMMARY OF THE INVENTION

The method and system described herein automatically directs a user's posts or requests for assistance to the appropriate organization responsible for responding to or addressing the incident reported, as based on that user's location and the location of the appropriate organization. A query of a database of organizations, categorized by location and purpose, determines the appropriate organization relevant to a user's location and incident type. The report is then directed and assigned to such organization for their review and response, which can be distributed through well known forms of communications (such as email, push notification, text messaging, SMS, MMS, XML, HTML, RSS, CAP) with details of the report and a hyperlink that directs the responding organization to the full report details as geolocated on a map with the associated multi-media content. The method and system can also send an automatic message from an organization to a specific user in response to such user's post or request for assistance and establish a two-way chat communication (text, voice, live video chat) between the user and the assigned organization based on the foregoing. The method and system that can securely store, distribute, filter and retrieve such data as described herein.

According to some possible implementations, a server may send a plurality of channels to a plurality of devices connected to a network. A server may receive, from the devices, a plurality of electronic messages where the electronic messages include a selected channel from the plurality of channels, an incident location and multi-media content. Each of the electronic messages may be automatically directed to organizations based on the selected channel and proximity to the incident location. Each of the electronic messages is assigned to an organization based on the selected channel of the report for review and response by the organization. The server may receive responses for each of the assigned electronic messages. Each of the responses may be sent by the application server to the user device with which the electronic message originated. Automated messages from organizations may be sent to user devices in response to received electronic messages. Two-way, instant communication sessions may be established between a specific device and a particular organization.

BRIEF DESCRIPTION OF THE DRAWING FIGURES

The novel features which are characteristic of the method and system described herein are set forth in the appended claims. However, the example implementations and embodiments, together with further objects and attendant advantages, will be best understood by reference to the following detailed description taken in connection with the accompanying drawings in which:

DETAILED DESCRIPTION OF THE PREFERRED EMBODIMENT

The following detailed description of example implementations refers to the accompanying drawings. The same reference numbers in different drawings may identify the same or similar elements.

Figure 1:
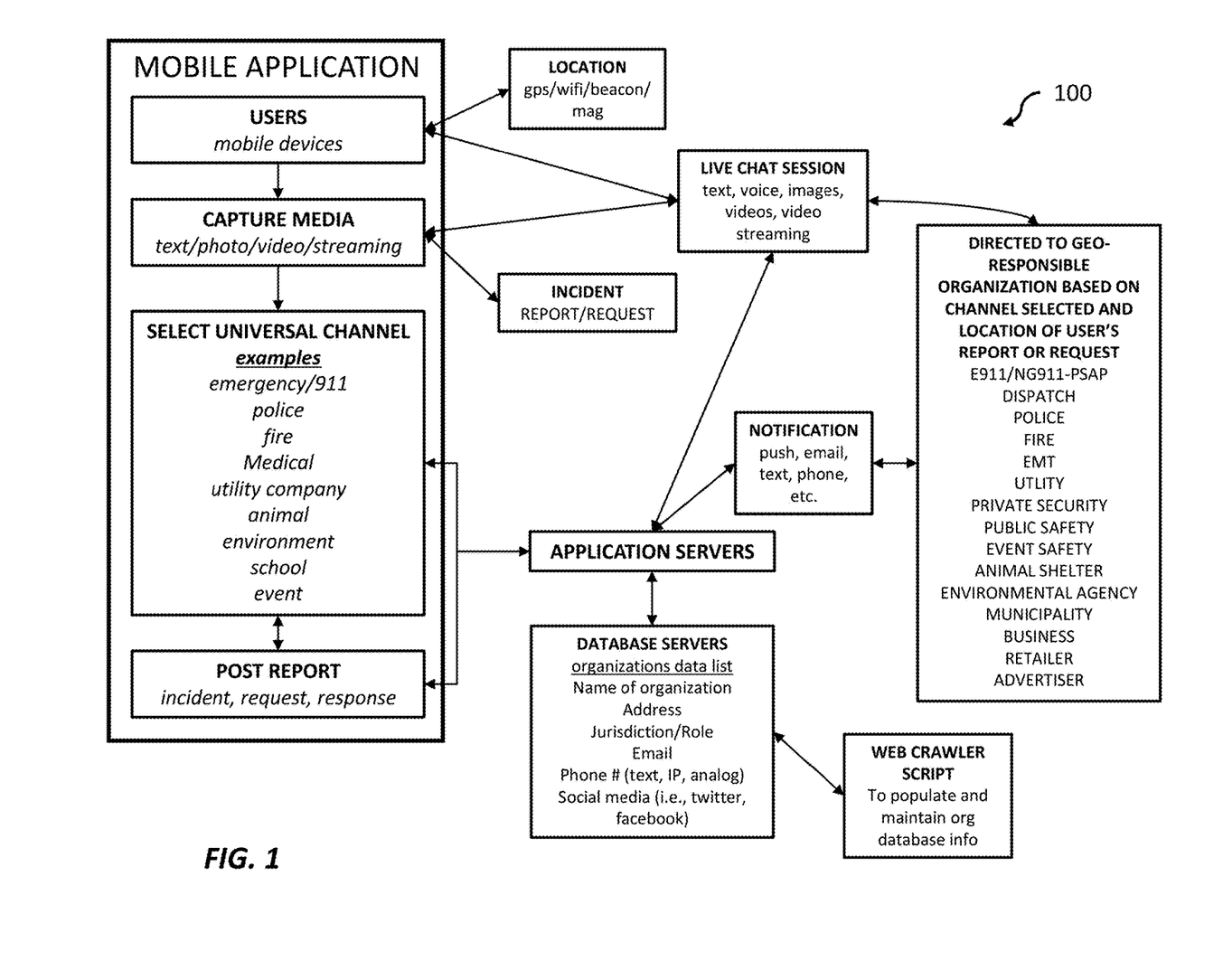
FIG. 1 is flow chart showing an overview of the system for carrying out the method and system described herein.

FIG. 1 is a diagram of an overview of an example implementation 100 described herein. As shown in FIG. 1, the method and system includes several novel features that can target individual organizations specifically based on their location and area of responsibility or purpose, and provide such organizations with crowdsourced multi-media content from mobile enabled users sending information or seeking assistance within their area of responsibility, purpose or jurisdiction. This content can be distributed as publically available or privately available content using channels or categories and would only be visible to users within a particular location as defined by a zip code, postal code, town, city, state, county, region or specific geo-coordinates (i.e., latitude and longitude with a defined radius) representing a particular site, facility, venue or other area of interest.

It could also be represented based on organization type such as a business, municipality or government agency. Furthermore, it could be represented specific to a physical structure such as a building, complex, campus, bridge, tunnel, stadium, arena, track, field, mall, roadway, etc. Such communications would be bidirectional with the user to automatically determine the user's location and the closest organization relevant to the user's needs, requests or information shared.

Each device connected to the system 100 by a user may provide location data sourced from GPS, beacon, and magnetic data from the users' devices, nearby devices and extrapolated from known devices connected to the system.

Figure 8:
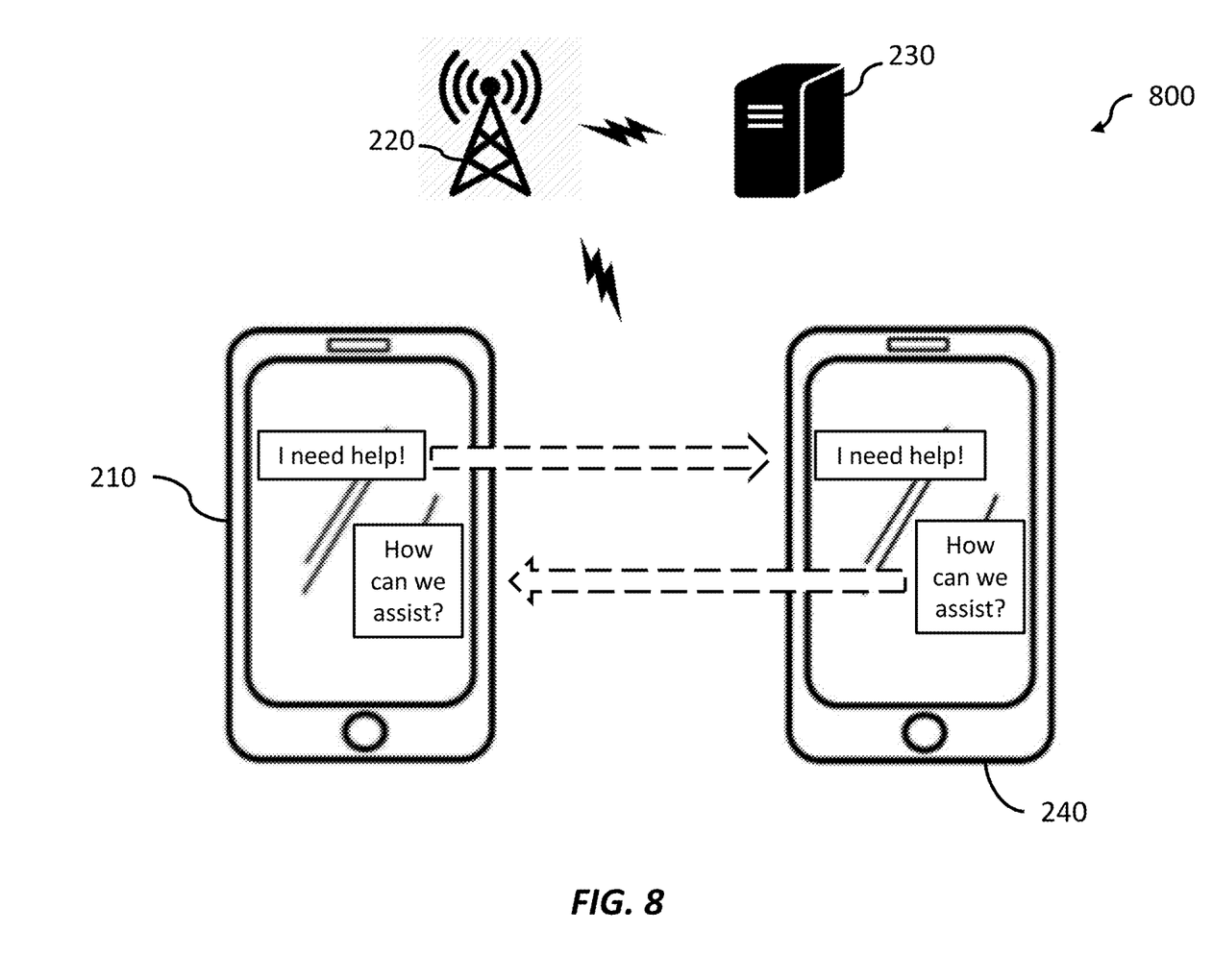
FIG. 8 is a diagram of an example environment where a method and/or system of establishing instance, two-way communication between a user of the system and an organization is implemented.

The system 100 further may facilitate live chat sessions between users and organizations, either directly, device to device, or indirectly through the application servers acting as a relay (see also FIG. 8). Electronic messages containing incident reports and/or requests may be relayed through push, email, text, phone messaging.

The application's servers interact with a number of database servers to maintain organization contact information and geographic area of jurisdiction in order to direct electronic messages to the proper organization. A web crawler script populates and maintains the organization contact information in the database servers. This process may occur periodically or on a continual basis.

Figure 2:
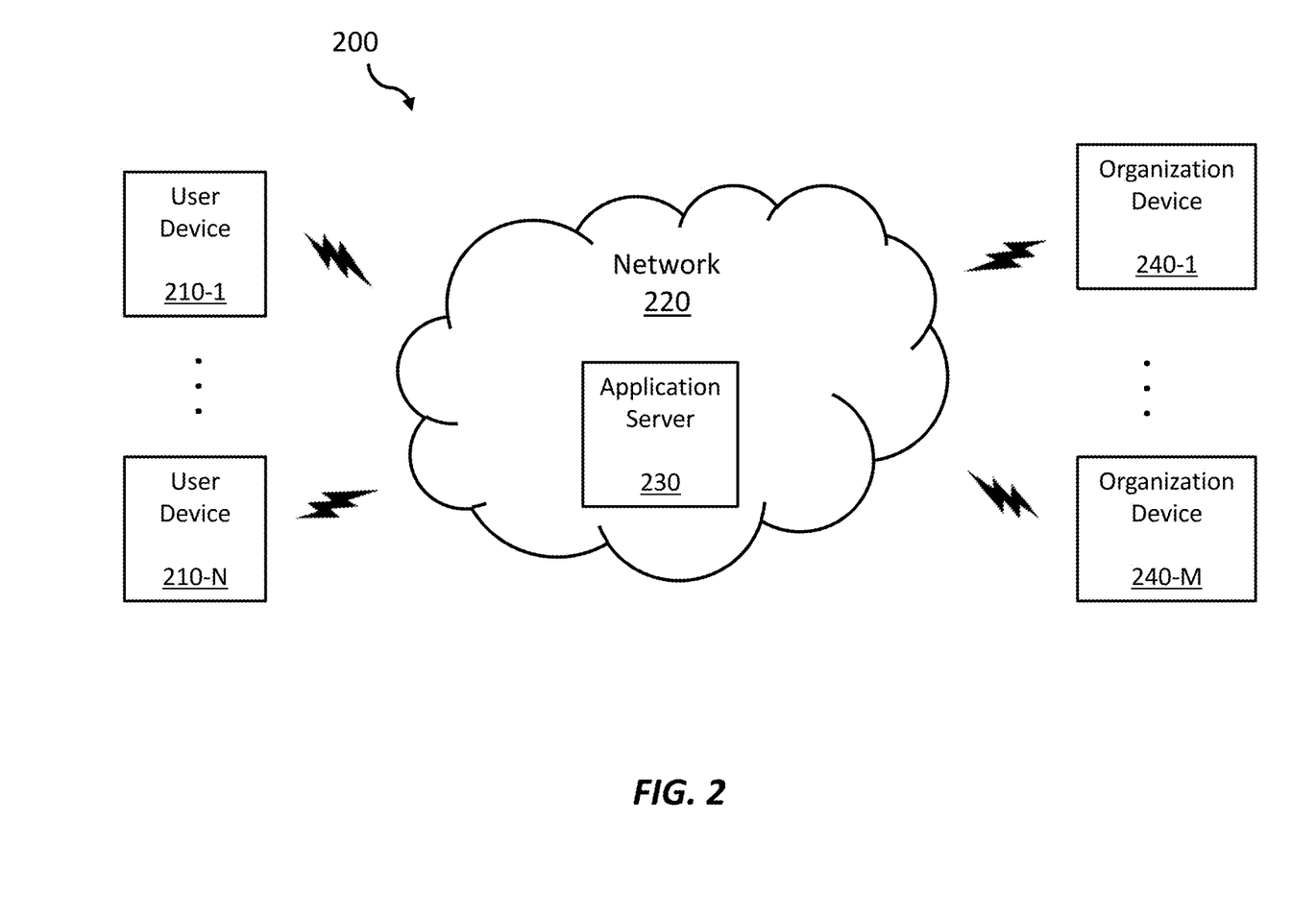
FIG. 2 is a diagram of an example environment in which systems and/or methods, descried herein, may be implemented.

FIG. 2 is a diagram of an example environment 200 in which systems and/or methods, described herein, may be implemented. As shown in FIG. 2, environment 200 may include a plurality of user devices 210-1 through 210-N, a network 220, an application server 230, and a plurality of organization devices 240-1 through 240-M. Devices of environment 200 may interconnect via wired connections, wireless connections, or a combination of wired and wireless connections. The devices of the system and method are generally a number of networked hardware devices, such as computers, cameras, mobile devices, and the like, that are interconnected to a network, such as a private network or the Internet.

User device 210 may include one or more devices used by a user to access network 220, and application server 230, shown in environment 200. For example, user device 210 may include a computing device, such as a desktop computer, a laptop computer, a tablet computer, a mobile phone, or a similar type of device. In some implementations, a user may use user device 210 to provide incident information to and/or receive incident information, or a request for incident information from one or more devices of environment 200, such as application server 230, organization device 240, and/or remote device 250.

Organization device 240 may include one or more devices used by an organization, such as a police or fire department, for example, to access network 220, application server 230, shown in environment 200. For example, organization device 240 may include a computing device, such as a desktop computer, a laptop computer, a tablet computer, a mobile phone, or a similar type of device. In some implementations, an authorized user at the organization may use organization device 240 to provide incident information to and/or receive incident information, or a request for incident information from one or more devices of environment 200, such as application server 230, and/or user device 210.

Network 220 may include one or more wired and/or wireless networks associated with a user. For example, network 220 may include a local area network (LAN), a wide area network (WAN), a private network, an intranet, a cellular network, a public land mobile network (PLMN), a metropolitan area network (MAN), a telephone network (e.g., the Public Switched Telephone Network (PSTN)), an ad hoc network, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
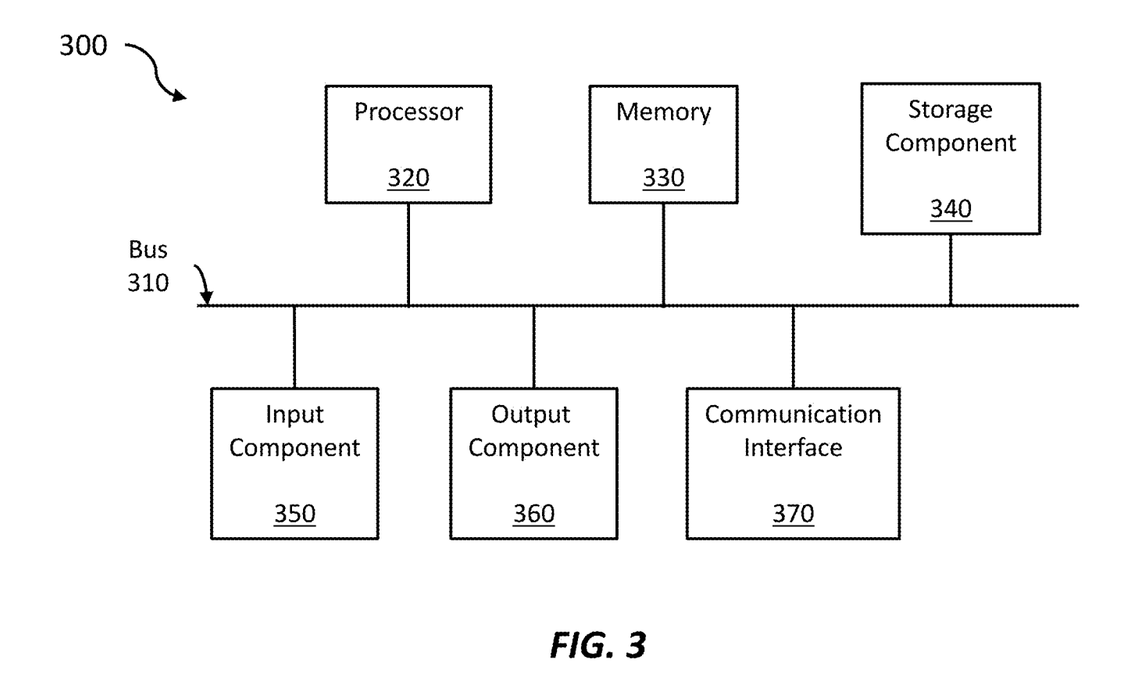
FIG. 3 is a diagram of example components of one or more devices of FIG. 2.

FIG. 3 is a diagram of example components of a device 300. Device 300 may correspond to user device 210, application server 230, requesting authority device 240, and remote device 250. In some implementations, user device 210, application server 230, and organization device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
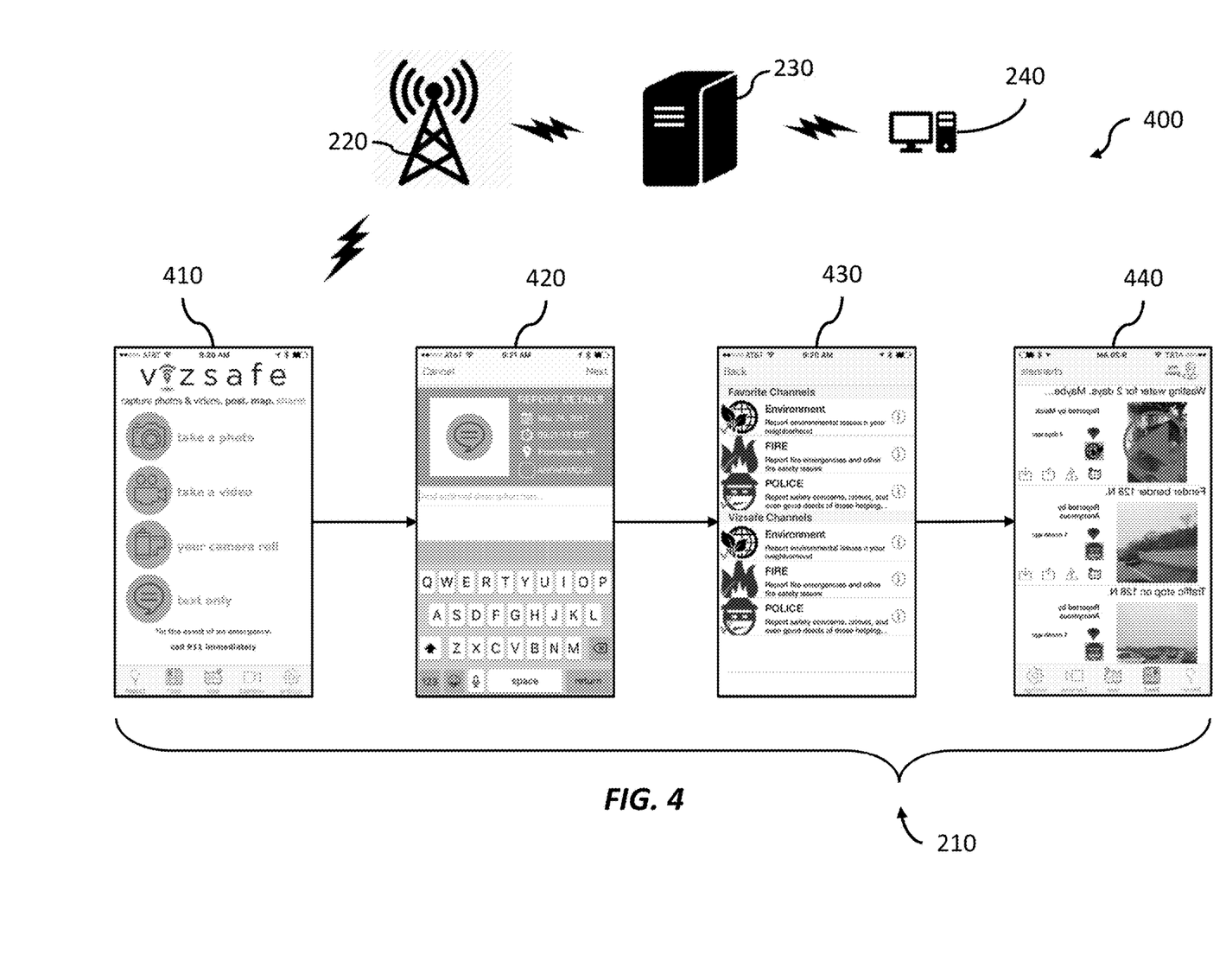
FIG. 4 is a diagram of an overview of a system and/or method, described herein, where of a user posts a report and/or request for assistance is implemented.

FIG. 4 shows an example implementation 400 of a user using a user device 210 to compose and post and electronic message containing an incident report or request for assistance according to the method and system described herein. With user device 210, the user selects a type of electronic message to compose, such as a photo, video, or text, illustrated at step 410. The user may also immediately call an emergency service, such as 911, using the mobile application. The user may also create an audio message as well. The user then composes a message, illustrated at step 420, which will also be prepopulated with metadata, such as the user's current location, date and time, and whether the user desires to remain anonymous. Once the user composes their message, the user may select a channel to post the electronic message to. Application server 230 sent the channels to the user device 210 through network 220, illustrated at step 430. After selecting the channel, the message is posted to the channel, illustrated at 440, where the electronic message is transmitted from the user device 210 through network 220 to the application servers 230. The applications servers 230 then automatically direct the electronic message to the most pertinent organization 240

For example, using the application described herein, a user could capture an incident with their mobile enabled device or smartphone, select from a set of universal channels or categories depending on the incident type, and then securely post or upload the report to a server apparatus on the network (i.e., Internet, Intranet, LAN/WAN, cloud). This report would then be automatically directed to the presiding authority based on the channel and/or category selected. This organization would receive a message instantly through an automated communication (such as email, push notification, text messaging, SMS, MMS, XML, HTML, RSS, CAP) with details of the report and a hyperlink that directs the responding organization to the report details geolocated on a map with the associated multi-media and metadata content (see, e.g. FIG. 7). Such multi-media content could include but is not limited to photos, videos, live video streaming, audio clips, live audio streaming and text based messaging (i.e., multi-media). Such metadata could include but is not limited to data such as latitude, longitude, elevation, floor level, field of view, orientation, bearing, date, time, user details, device, carrier and network information.

Figure 5:
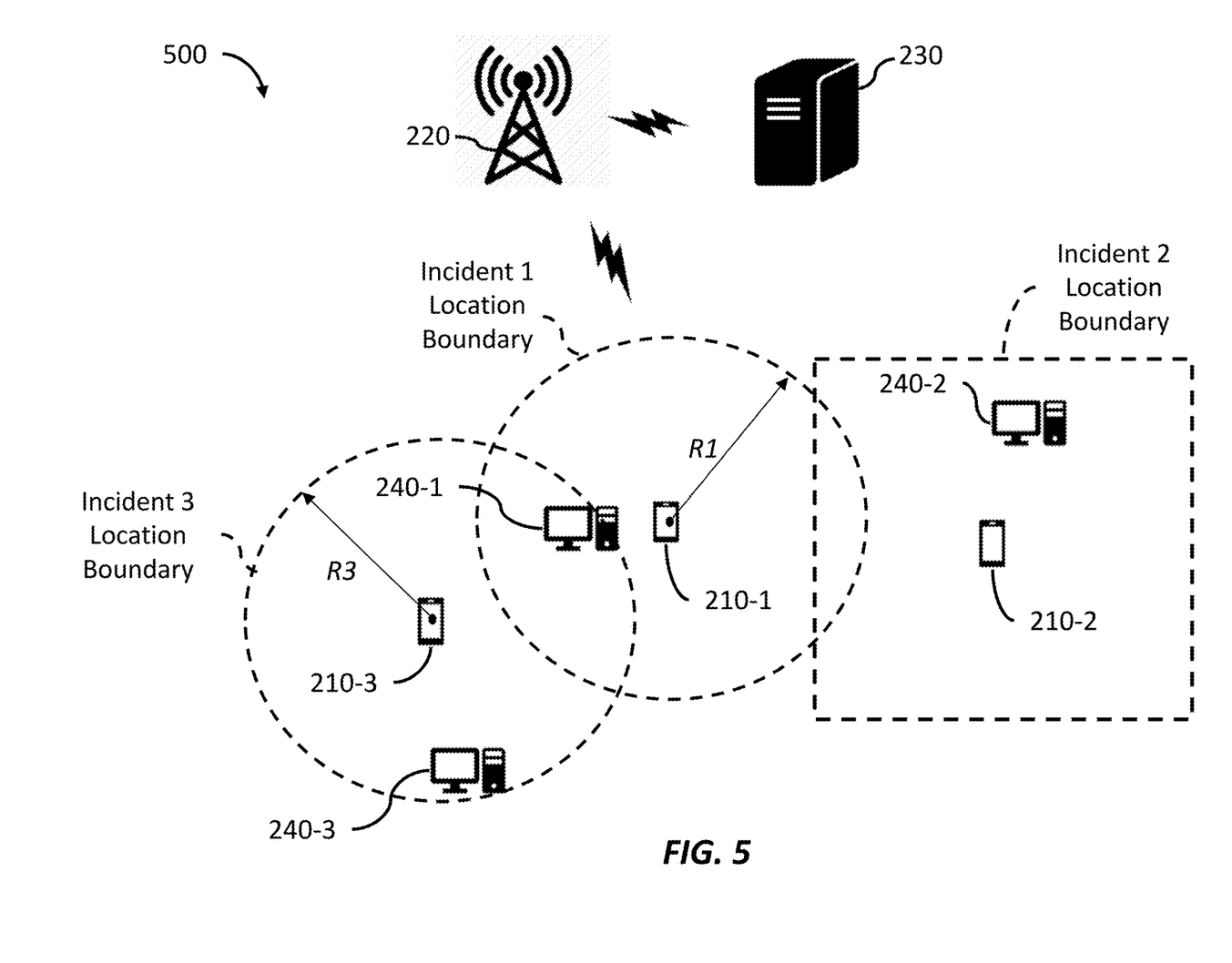
FIG. 5 is a diagram of an example environment in which systems and/or methods, described herein, for facilitating automatic delivery of user reports to organizations may be implemented.

FIG. 5 is a diagram of an example environment 500 in which systems and/or methods, described herein, for facilitating automatic delivery of user reports to organizations may be implemented. As shown in FIG. 5, Incident 1 is shown having a boundary described by radius R1, proximate to the user device 210-1, creating an incident report. Application server 230, using the database of organization contact information, may identify organization device 210-1 as being proximate to user device 210-1, where organization device 240-2 may not be determine to proximate to the user device. In addition, to a geographic proximity, application server 230 via the selected channel of the post for the type of incident may also ascertain that organization 240-1 is the most appropriate organization to direct the electronic message.

As shown in FIGS. 4 and 5, a user may request assistance from the local police department. Through an application or web based form or page on their smartphone or mobile device, they could capture a photo or video and select the Police channel as a category. Based on that user's location, the image, along with the associated metadata (such as date/time, geolocation and user details) would automatically be directed to the nearest police department even if that police department is not an active user of the application by sending the multi-media message through an automatic communication as described above. In this example, the police department could be substituted by other types of organizations depending on the user's needs or requests, such as a first responder organization or Public Safety Answering Point (PSAP) that relays or dispatches emergency information to the appropriate law enforcement or public safety agency (i.e., police, fire, EMT).

As further shown in FIG. 5, Incident 2 is shown having a boundary defined around user device 210-2, illustrating a structure such as facility building, complex, campus, venue or event to organization device 240-2, which is identified by application server 230 as having proper jurisdiction. Such reports could automatically be directed to a private organization responsible for a facility, building, complex, campus, venue or event for the purpose of safety, security, maintenance, or risk mitigation. These incident reports could also be automatically directed to many other types of universal channels or categories as selected by a user based on the incident type they are reporting, and directed to a local organization using the process described above, such as an animal shelter, an electric utility, a municipality or a news station.

As further shown in FIG. 5, Incident 3 is shown having a boundary defined by radius R3 around user device 210-3.

Although organization 240-1 falls within geographic proximity to user device 210-3, electronic messages may be forwarded to another more appropriate organization, such as organization device 240-3, based on the type or category of report, e.g. a request for emergency aid versus a request for police intervention.

In another example, such reports could be directed to a local organization for the purposes of a promotion, giveaway, contest, reward and the like.

Figure 6:
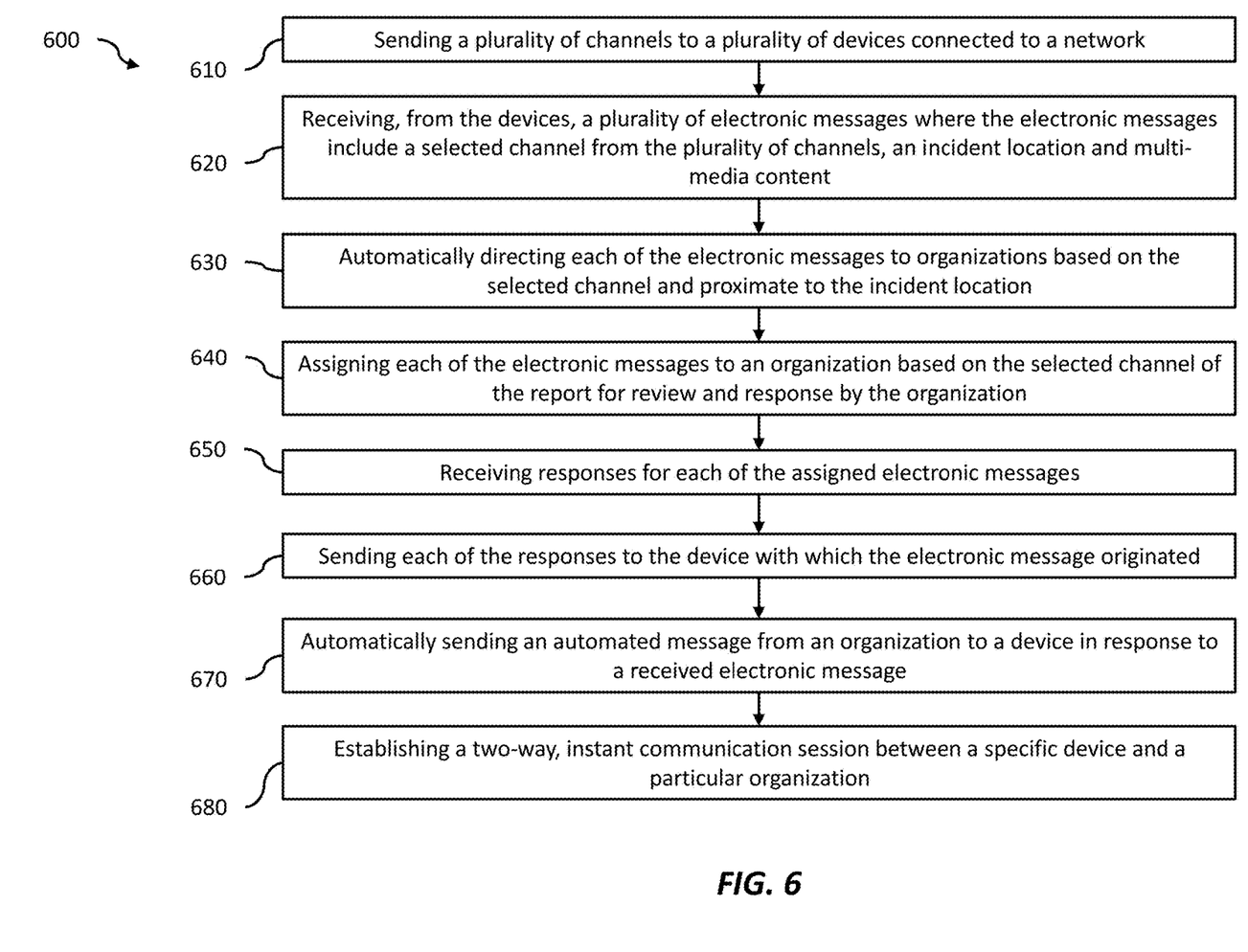
FIG. 6 is a flow chart of an example process where users may post report and/or request assistance from organizations automatically based on proximity to the organization and channel and/or category of the report and/or request.

FIG. 6 is a flow chart of an example process 600 where users may post report and/or request assistance from organizations automatically based on proximity to the organization and channel and/or category of the report and/or request.

Process 600 may include sending a plurality of channels to a plurality of devices connected to a network (block 610). For instance, application server 230 may send, based on user device 210 location and organization contact information stored in the database servers, a list of channels based on organization type and location.

Process 600 may include receiving, from the devices, a plurality of electronic messages where the electronic messages include a selected channel from the plurality of channels, an incident location and multi-media content (block 620). For example, user device 210 may compose electronic message incident report or request for assistance, which the user then sends to the application server 230 through the network 220, as further illustrated in FIGS. 2-4.

Process 600 may include automatically directing each of the electronic messages to organizations based on the selected channel and proximity to the incident location (block 630). For example, after the application server 230 receives the report from the user device 210, the application server then transmits the report to directly to the organization as shown in FIGS. 1-3.

Figure 7:
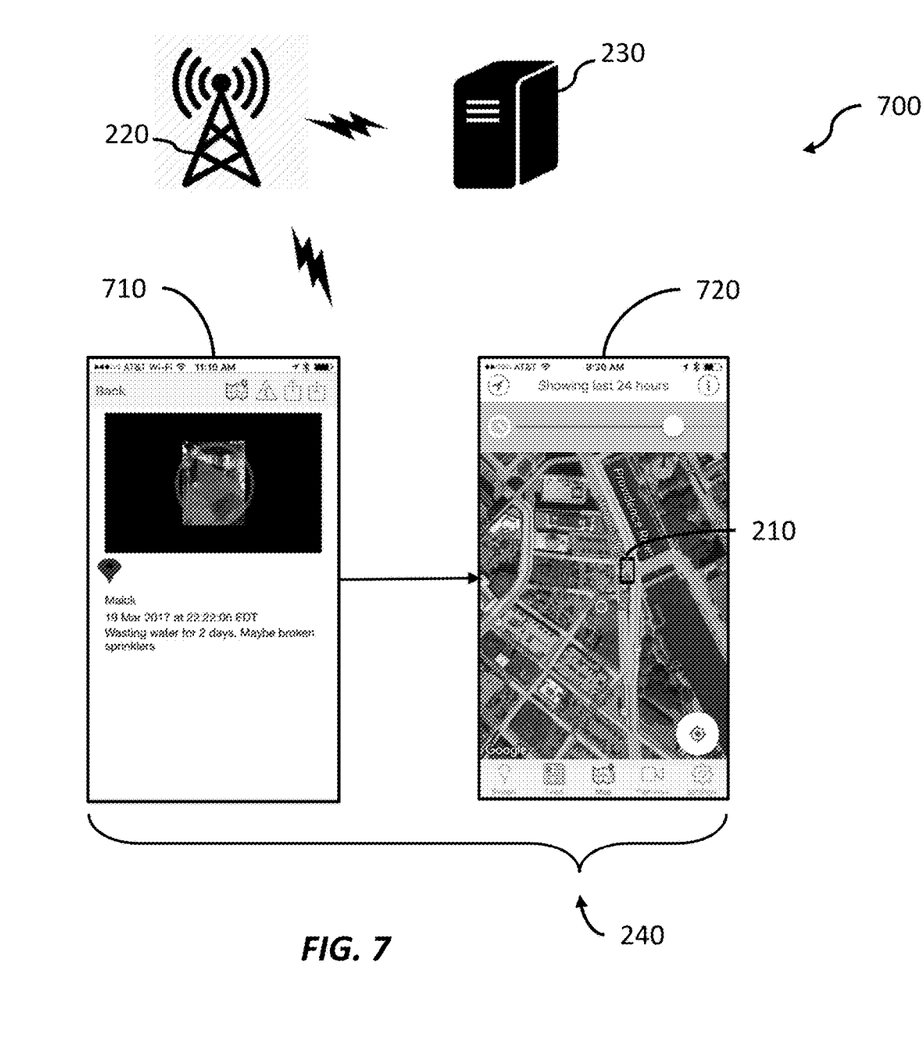
FIG. 7 is a diagram of an example environment in which a method and/or system of providing an organization with geo-located user requests and/or reports is implemented.

Process 600 may include assigning each of the electronic messages to an organization based on the selected channel of the report for review and response by the organization (block 640). For example, application server 230 may, through querying database servers, ascertain the most appropriate organization to forward the electronic message report based on the selected channel by the user and jurisdiction and role of the organization. The organization may receive the electronic message on an organization device 240, where the organization may view the electronic message (FIG. 7 at 710) a geo-located map of user device 210 for the incident being reported or assistance requested (FIG. 7 at 720).

Process 600 may include receiving responses for each of the assigned electronic messages (block 650). For example, application server may receive responses to the electronic messages from the organization 240. Each of the responses may be sent by the application server 230 to the user device 210 with which the electronic message originated (block 660). Automated message from an organization 240 to a user device 210 in response to a received electronic message may be automatically sent by application server 230 (block 670).

Process 600 may include establishing a two-way, instant communication session between a specific device and a particular organization (block 680). For example, FIG. 8 is a diagram of an example environment 800 where a method and/or system of establishing instance, two-way communication between a user of the system and an organization is implemented. Application server 230 may facilitate initiating a two-way live chat, which may then be carried out directly between the user device 210 and organization device 240.

Therefore, it can be seen that the method and system described herein facilitates communication between users reporting incidents and/or requesting assistance and organizations proximate to the user or having jurisdiction proximate to the user's geographic location and type of incident and/or assistance being requested. The method and system automatically directs a user's posts or requests for assistance to the appropriate organization responsible for responding to or addressing the incident reported, as based on that user's location and the location of the appropriate organization. The method and system queries a database of organizations, categorized by location and purpose, determines the appropriate organization relevant to a user's location and incident type and generate a full report for review as geolocated on a map with the associated multi-media content. Furthermore, the method and system facilitates sending automatic messages from an organization to a specific user in response to such user's post or request for assistance and establish a two-way communication between the user and the assigned organization based on the foregoing.

It would be appreciated by those skilled in the art that various changes and modifications can be made to the illustrated embodiments without departing from the spirit of the present invention. All such modifications and changes are intended to be covered by the appended claims.

What is claimed is:

1. A method, comprising:
sending a plurality of channels to a plurality of devices connected to a network, wherein the plurality of channels are selected as a function of a geographic location of a respective device of the plurality of devices;
receiving, from the devices, a plurality of electronic messages where the electronic messages include a selected channel from the plurality of channels, an incident location, the geographic location of the respective device, and multi-media content; and
automatically directing each of the electronic messages to organizations based on the received selected channel from the plurality of channels, the geographic location of the respective device, and a proximity to the incident location.

2. The method of claim 1, further comprising:
assigning each of the electronic messages to an organization based on the selected channel of a report for review and response by the organization.

3. The method of claim 2, further comprising:
receiving responses for each of the assigned electronic messages; and
sending each of the responses to the device with which the electronic message originated.

4. The method of claim 1, further comprising:
automatically sending an automated message from an organization to a device in response to a received electronic message.

5. The method of claim 1, further comprising:
establishing a two-way, instant communication session between a specific device and a particular organization.

6. The method of claim 1, wherein the incident location is selected from the group consisting of a postal code, a town, a city, a state, a county, a geographic region, a predefined radius about a specific geographic coordinate, and proximity to a requesting authority.

7. The method of claim 1, wherein the multi-media of the electronic message is selected from the group consisting of photos, videos, live video streaming, audio clips, live audio streaming, text based messaging and associated metadata.

8. A non-transitory computer-readable medium storing instructions, the instructions comprising:
one or more instructions that, when executed by one or more processors, at least partially implemented in hardware, of a device, cause the one or more processors to:
send a plurality of channels to a plurality of devices connected to a network, wherein the plurality of channels are selected as a function of a geographic location of a respective device of the plurality of devices;
receive, from the devices, a plurality of electronic messages where the electronic messages include a selected channel from the plurality of channels, an incident location, the geographic location of the respective device, and multi-media content; and
automatically direct each of the electronic messages to organizations based on the selected channel from the plurality of channels, the geographic location of the respective device, and the proximity to the incident location.

9. The non-transitory computer-readable medium of claim 8, wherein one or more instructions that, cause the one or more processors further to:
assign each of the electronic messages to an organization based on the selected channel of a report for review and response by the organization.

10. The non-transitory computer-readable medium of claim 9, wherein one or more instructions that, cause the one or more processors further to:
receive responses for each of the assigned electronic messages; and
send each of the responses to the device with which the electronic message originated.

11. The non-transitory computer-readable medium of claim 8, wherein one or more instructions that, cause the one or more processors further to:
automatically send an automated message from an organization to a device in response to a received electronic message.

12. The non-transitory computer-readable medium of claim 8, wherein one or more instructions that, cause the one or more processors further to:
establish a two-way, instant communication session between a specific device and a particular organization.

13. The non-transitory computer-readable medium of claim 8, wherein the incident location is selected from the group consisting of a postal code, a town, a city, a state, a county, a geographic region, a predefined radius about a specific geographic coordinate, and proximity to a requesting authority.

14. The non-transitory computer-readable medium of claim 8, wherein the multimedia of the electronic message is selected from the group consisting of photos, videos, live video streaming, audio clips, live audio streaming, text based messaging and associated metadata.

15. A system, comprising:
a server, the server configured to:
send a plurality of channels to a plurality of devices connected to a network, wherein the plurality of channels are selected as a function of a geographic location of a respective device of the plurality of devices;
receive, from the devices, a plurality of electronic messages where the electronic messages include a selected channel from the plurality of channels, an incident location, the geographic location of the respective device, and multi-media content; and
automatically direct each of the electronic messages to organizations based on the selected channel, geographic location of the respective device, and proximity to the incident location.

16. The system of claim 15, wherein the server is further configured to:
assign each of the electronic messages to an organization based on the selected channel of a report for review and response by the organization.

17. The system of claim 16, wherein the server is further configured to:
receive responses for each of the assigned electronic messages; and send each of the responses to the device with which the electronic message originated.

18. The system of claim 15, wherein the server is further configured to:
automatically send an automated message from an organization to a device in response to a received electronic message.

19. The system of claim 15, wherein the server is further configured to:
establish a two-way, instant communication session between a specific device and a particular organization.

20. The system of claim 15, wherein the incident location is selected from the group consisting of a postal code, a town, a city, a state, a county, a geographic region, a predefined radius about a specific geographic coordinate, and proximity to a requesting authority.

21. The system of claim 15, wherein the multi-media of the electronic message is selected from the group consisting of photos, videos, live video streaming, audio clips, live audio streaming, text based messaging and associated metadata.

* * * * *